(12) United States Patent
Desailly et al.

(10) Patent No.: US 7,376,525 B2
(45) Date of Patent: May 20, 2008

(54) APPARATUS AND METHOD FOR ESTIMATION OF INITIAL PHASE OF A BRUSHLESS MOTOR

(75) Inventors: Roger Desailly, Vitry aux Loges (FR); Jeremy Malaize, Cheptainville (FR); Jean Levine, Paris (FR); Daniel Gvero, Chateauneuf sur Loire (FR); Franck Duquenoy, Olivet (FR)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 11/431,417

(22) Filed: May 9, 2006

(65) Prior Publication Data

US 2007/0032970 A1    Feb. 8, 2007

Related U.S. Application Data

(60) Provisional application No. 60/679,531, filed on May 10, 2005.

(51) Int. Cl.
*G06F 19/00* (2006.01)
(52) U.S. Cl. .......................................... 702/72; 702/57
(58) Field of Classification Search ................ 702/106, 702/59, 72, 57; 318/718, 720, 724, 400.06, 318/400.08, 400.12, 400.15, 400.17, 254, 318/431, 459, 462, 463, 464, 500, 605
See application file for complete search history.

(56) References Cited

U.S. PATENT DOCUMENTS 4,884,016 A    11/1989 Aiello

| | | | | |
|---|---|---|---|---|
| 5,376,870 A | * | 12/1994 | Ueda et al. | 318/603 |
| 5,834,912 A | | 11/1998 | Nakamura et al. | |
| 5,874,821 A | * | 2/1999 | Monleone | 318/600 |
| 6,401,875 B1 | * | 6/2002 | Marvin et al. | 187/393 |
| 2004/0250630 A1 | | 12/2004 | Yao | |

FOREIGN PATENT DOCUMENTS

EP    0708521 A1 *   9/1995

OTHER PUBLICATIONS

Deutscher, "A Linear Differential Operator Approach to Flatness Based Tracking for Linear and Non-Linear Systems," *Int. J. Control*, vol. 76, No. 3, pp. 266-276, 2003.

(Continued)

*Primary Examiner*—John Barlow
*Assistant Examiner*—Douglas N Washburn
(74) *Attorney, Agent, or Firm*—Stoel Rives LLP; Brian F. Swienton

(57) ABSTRACT

An apparatus comprises a brushless motor, driver, incremental displacement sensor, and processor. The motor has a rotor, stator, and electrical terminals accepting a drive signal. The initial phase of the rotor is unknown. The driver is connected to the electrical terminals and produces the drive signal. The displacement sensor is configured to measure a displacement of the rotor and to produce an output signal. The processor has an input receiving the output signal and an output connected to the driver. The processor causes the driver to produce the drive signal according to a predetermined function of time, observes the output signal from the displacement sensor resulting from the drive signal, and performs mathematical computations on the basis of the observed output signal and a model of dynamic behavior of the motor to estimate the initial phase of the rotor.

52 Claims, 6 Drawing Sheets

OTHER PUBLICATIONS

Antritter et al., "Tracking Control for Nonlinear Flat Systems by Linear Dynamic Output Feedback," *IFAC*, 2004.

Martin et al., "Flat Systems, Equivalence and Trajectory Generation," (abstract) http://citeseer.ist.psu.edu/update/659411, Apr. 23, 2006.

Malaizé et al., "Active Estimation of the Initial Phase for Brushless Synchronous Motors," 9th International Workshop on Advanced Motion Control, Istanbul, (IEEE Catalog No. 06TH8850C; ISBN: 0-7803-9513-3), Mar. 27-29, 2006.

International Search Report for PCT/US06/018422, dated Jan. 4, 2007, 4 pages.

Written Opinion of the International Searching Authority for PCT/US06/018422, dated Jan. 4, 2007, 9 pages.

* cited by examiner

APPARATUS AND METHOD FOR ESTIMATION OF INITIAL PHASE OF A BRUSHLESS MOTOR

RELATED APPLICATIONS

This application claims priority to U.S. Provisional Patent Application No. 60/679,531, entitled "Improved Method of Control of Synchronous Motors by Initial Phase Determination," filed on May 10, 2005, which is hereby incorporated by reference in its entirety.

TECHNICAL FIELD

This disclosure relates generally but not exclusively to brushless or synchronous motors, and more particularly, to initial phase estimation of such motors.

BACKGROUND INFORMATION

There is a general trend in industrial applications to move from motors with brushes, such as DC motors, to synchronous motors. For instance, a growing use of synchronous motors has been witnessed in the semiconductor wafer processing industry where they are used for high precision positioning. The trend towards using brushless motors is motivated by their longer lifetime, lower maintenance costs, and improved cleanliness of operation. For example, motor brushes experience wear and tear, which can result in spreading out small dust particles that can be injurious to semiconductor wafers and other work pieces. Synchronous motors therefore make a more reliable solution since they are not subjected to the wear of brushes.

To eliminate mechanical contacts, current commutations are performed electronically for a brushless or synchronous motor. To perform these commutations, a controller driving a synchronous motor ideally has information on the reference or initial phase of the motor. Putting the control currents in exact phase with the motor yields an optimal use of the motor. A lack of knowledge of the reference phase can make it difficult or impossible to avoid heating and to achieve desired precision control. Therefore, the determination of a reference phase is desired for precise synchronous motor control.

To get information on the reference phase, state of the art solutions require additional undesirable hardware to be added to the motor. For example, Hall effect sensors can be used to give a direct measurement of the magnetic field inside the motor. Resolvers may also be used to get a reference position since they provide absolute position or angle measurements. Finally, by measuring current inside the motor, the back electromotive force created by an electrical circuit moving into a magnetic field can lead to a determination of a reference position. No matter how efficient these solutions are, however, they require additional components to determine the reference phase, and these components, especially Hall effect sensors and resolvers, are quite expensive. Furthermore, adding new components means adding wires, connectors, and redesigning communication protocols and new algorithms to process the information from these dedicated components.

Existing solutions with none of the aforementioned hardware additions are based on the periodic magnetic field inside a motor. One such solution injects a constant reference current to one electrical phase of the motor, thereby making it stabilize where the magnetic field is zero, which may not be a desired position. This solution, which is based upon measuring how far the motor moves to arrive at its in-phase position, subjects the motor to an unknown and uncontrolled movement, which may not be acceptable in some applications. This solution may work provided friction is not too significant, but friction can cause the resting position to differ from the true in-phase position. Moreover, this solution does not meaningfully take advantage of the motor's dynamic behavior. Finally, when using this solution, one can witness erratic position shifts around the equilibrium position before stabilizing. These movements can be as large as the magnetic pitch, which may be a couple of millimeters, and such large oscillations are not acceptable for some applications.

SUMMARY OF THE DISCLOSURE

According to one embodiment, an apparatus comprising a brushless motor, a driver, an incremental displacement sensor, and a processor. The brushless motor has a rotor, a stator, and electrical terminals accepting an electric drive signal. The motor is characterized by an a priori unknown initial phase of the rotor with respect to the stator. The driver is connected to the electrical terminals and produces the electric drive signal. The incremental displacement sensor is configured to measure a displacement of the rotor with respect to the stator and to produce an output signal indicative of the displacement. The processor has an input receiving the output signal from the position sensor and an output connected to the driver. The processor is configured to cause the driver to produce the electric drive signal according to a predetermined function of time, to observe the output signal from the displacement sensor resulting from the electric drive signal, and to perform mathematical computations on the basis of the observed output signal and a model of dynamic behavior of the motor to estimate the initial phase of the rotor with respect to the stator.

According to another embodiment, a method estimates an a priori unknown initial phase of a rotor with respect to a stator. The rotor and the stator are parts of a synchronous motor that is not equipped with a capability to directly measure the absolute phase of the rotor with respect to the stator. The method applies to the motor an electric drive signal according to a predetermined oscillating function of time, so as to cause a sequence of displacements of the rotor with respect to the stator. The method collects data from the motor in response to the electric drive signal. The method then performs mathematical computations on the basis of the collected data and a model of dynamic behavior of the motor to estimate the initial phase of the rotor with respect to the stator.

According to yet another embodiment, a method estimates an a priori unknown initial phase of a rotor with respect to a stator. The rotor and the stator are parts of a synchronous motor that is not equipped with a capability to directly measure the absolute phase of the rotor with respect to the stator. The dynamic behavior of the motor is modeled by a mathematical model that relates data observable from the motor to the initial phase. The mathematical model is characterized by one or more degrees of freedom. The method applies to the motor a plurality of electric drive signals, wherein each electric drive signal is a function of one or more of said one or more degrees of freedom, and each electric drive signal is characterized by a different set of values chosen for said one or more degrees of freedom. The method collects data from the motor in response to the electric drive signals. The method then performs mathematical computations on the basis of the collected data and a model of dynamic behavior of the motor to estimate the initial phase of the rotor with respect to the stator.

Details concerning the construction and operation of particular embodiments are set forth in the following sections with reference to the below-listed drawings.

DETAILED DESCRIPTION OF EMBODIMENTS

With reference to the above-listed drawings, this section describes particular embodiments and their detailed construction and operation. The embodiments described herein are set forth by way of illustration only. Those skilled in the art will recognize in light of the teachings herein that variations can be made to the embodiments described herein and that other embodiments are possible. No attempt is made to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

As one skilled in the art will appreciate in view of the teachings herein, certain embodiments may be capable of achieving certain advantages, including by way of example and not limitation one or more of the following: (1) facilitating the usage of synchronous motors with their attendant advantages, which may be especially desirable in semiconductor workpiece handling, where cleanliness and accuracy are important; (2) facilitating the use of incremental position sensors, which offer low cost and high accuracy; (3) more reliable and less erratic phase estimation, which in turn leads to improved efficiency and accuracy controlling the motor; (4) opportunities to minimize the magnitude of temporary motor displacement during initialization; (5) robust performance when conditions such as friction, load, and mass are unknown, and decreased sensitivity to variations in those conditions as some prior art techniques; and (6) little or no uncontrolled final position displacement resulting from the initialization. These and other advantages of various embodiments will be apparent upon reading the following.

A. Modeling of the Underlying Physical Phenomenon

Figure 1A:
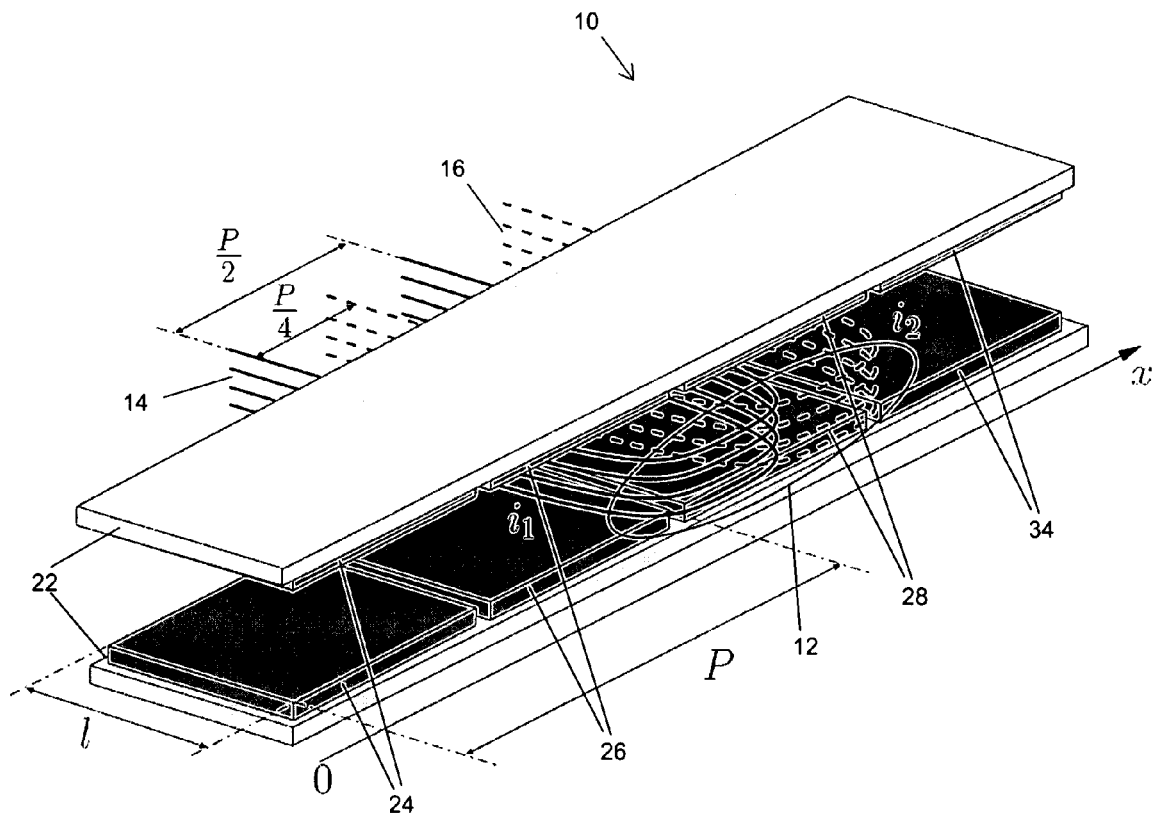
FIG. 1A is an illustration of a motor.

FIG. 1A illustrates a linear two-phase ironless motor 10. The systems, methods, and principles described herein are applicable to other types of motors, both linear and rotary motors, with any arbitrary number of phases Q. The systems, methods, and principles described herein are presented with reference to the motor 10 only as an example and without loss of generality. The motor 10 is a linear synchronous motor made up of two parts: a rotor 12 and a stator 22. The stator 22 comprises a pair of magnetic tracks (whose pitch is denoted by P) with magnets 24, 26, 28, and 34 arranged in alternating polarities so as to create a sinusoidal magnetic field $$B(x) = B_0 \sin\left(\frac{2\pi}{P}x\right) \quad (1)$$

as a function of position x, along the lengthwise direction of the tracks. The rotor 12 comprise electrical circuits, such as coils 14 and 16 and possibly other elements not shown. The number of coils represents the number of phases of the motor 10. As shown, the two coils 14 and 16 are offset from one another by an amount P/4 in the x direction. The currents in each coil generate Laplace's forces through interactions with the magnetic field B(x). These forces may be modeled as follows:

$$F_1 = K_m \sin\left(\frac{2\pi}{P}x\right)i_1 \quad (2)$$

$$F_2 = K_m \cos\left(\frac{2\pi}{P}x\right)i_2 \quad (3)$$

where $K_m$, the motor's gain, is equal to $2\, lB_0$, where l is the length of the active portion of the coils 14 and 16 between the magnets, and $x=x_0+d$ where $x_0$ is the unknown initial position of the rotor 12, and d represents the displacement relative to that initial position. Together these forces, cumulatively F, propel the rotor forward in the x direction. In a more general case of Q phases, this total force F can be modeled as follows:

$$F = \sum_{j=1}^{Q} F_j = K_m \times \sum_{j=1}^{Q} \sin\left(\frac{2\pi}{P}x + (j-1)\Delta\varphi_Q\right)i_j \quad (4)$$

For the case when Q=2, $\Delta\phi_2=\pi/2$; for the case when Q=3, $\Delta\phi_3=2\pi/3$.

Note that different constructions and structures for the motor 10 are possible. For example, the magnets 24, 26, 28, and 34 may be electromagnets rather than permanent magnets, in which case the electrical terminals of the motor 10 are connected to the stator 22 rather than the rotor 12. Other variations will be apparent to those skilled in the art.

Figure 1B:
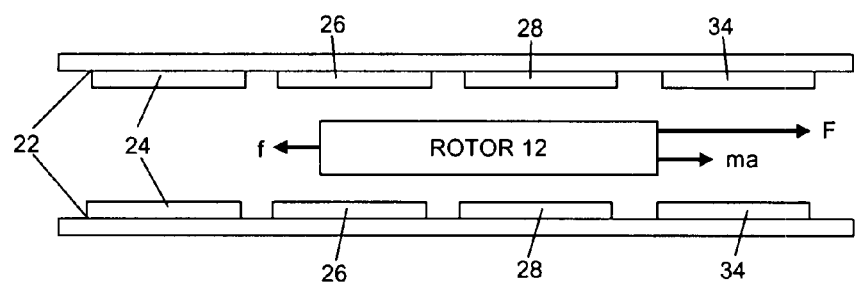
FIG. 1B is a free-body diagram of a rotor of the motor of FIG. 1, taken from a side view.

FIG. 1B is a free-body diagram of the rotor 12, showing the forces acting upon it. Those forces include the motor propulsion force F from equation (4), as well as an inertial force ma due to the mass m of the rotor subject to an acceleration a, and a friction force, f, which may be a function of both position x and velocity $\dot{x}$. Thus, a dynamic model for the motion of the motor 10 is the following:

$$m\ddot{x}=F-f(x,\dot{x}) \quad (5)$$

A simplifying assumption can be made by ignoring viscous friction since the motor 10 typically moves slowly during initialization. Then, the frictional force can be modeled as dry friction only as $f(x, \dot{x}) = f\, \text{sign}(\dot{x})$, where f on the right-hand side is the magnitude of the dry friction.

In general, the electrical dynamics of the currents in the coils 14 and 16 can be taken into account, according to the relation:

$$v_j = L\frac{di_j}{dt} + Ri_j + K_m \dot{x}\sin\left(\frac{2\pi}{P}x + (j-1)\Delta\varphi_Q\right) \quad (6)$$

where $v_j$ is the voltage across the jth coil, L is the inductance of each coil, R is a coil's resistance, and the final term represents a back electromotive force. However, it is typically valid to ignore these electrical dynamics, as any electrical variations are usually much faster than mechanical variations. In other words, one can safely assume in most cases that the current in each coil 14, 16 reaches its desired value immediately.

Assume that the driving currents are of the following form:

$$i_j = I\sin\left(\frac{2\pi}{P}x + (j-1)\Delta\varphi_Q\right), \quad (7)$$

which is representative of a classical field-oriented form of current control for a brushless motor, where I is a reference current. In the case of two phases (Q=2), the currents are as follows:

$$i_1 = I\sin\left(\frac{2\pi}{P}(\hat{x}_0 + d) + \varphi\right) \quad (8)$$

$$i_2 = I\cos\left(\frac{2\pi}{P}(\hat{x}_0 + d) + \varphi\right) \quad (9)$$

where $\hat{x}_0$ is an assumed estimate of the unknown initial motor position, and $\varphi$ is a supplementary degree of freedom. By substituting these currents in equation (4) under the assumptions regarding friction and electrical dynamics explained above, the following model of motor dynamics results:

$$\ddot{x} = \frac{K_m}{m}\cos(\varphi_0 - \hat{\varphi}_0 - \varphi)I - \frac{f}{m}\text{sgn}(\dot{x}). \quad (10)$$

The reference current I can be related to the second derivative of a reference trajectory $\ddot{x}_{ref}$ as follows:

$$\ddot{x}_{ref} = \frac{\hat{K}_m}{\hat{m}}I \quad (11)$$

where $\hat{K}_m$ and $\hat{m}$ are a priori estimates of $K_m$ and m. This leads to an alternative expression for the dynamic model equation (10), as follows:

$$\ddot{x} = \alpha\cos(\varphi_0 - \hat{\varphi}_0 - \varphi)\ddot{x}_{ref} - \frac{f}{m}\text{sgn}(\dot{x}) \quad (12)$$

where $$\alpha = \left(\frac{K_m}{m}\right)\left(\frac{\hat{m}}{\hat{K}_m}\right).$$

Note that different models are possible for the motor 10 or other motors. Depending upon the construction and structure of the motor, the nature of the model chosen to mathematically represent the motor's behavior, and the assumptions made by the modeler, models different from equation (10) or (12) can result. The methods, systems, techniques, and principles described herein are broadly applicable to many different models, not just the particular one given by equations (10) and (12).

B. Overview of an Initial Phase Estimation Technique

Given a model such as the one in equation (10) or (12), an initial phase estimation scheme can be devised. This estimation can be made by choosing I and $\varphi$, despite a lack of knowledge of the other parameters. The chosen drive current signal I (or equivalent drive voltage signal) causes a displacement of the rotor 12. This displacement, which is preferably small, is measured relative to the starting position by an incremental position sensor, which may be inexpensive. A series of alternating back-and-forth or oscillatory displacements may be induced via the electric drive signal. The resulting position displacement measurements acquired by the incremental sensor can be processed to perform mathematical computations to estimate the initial motor phase.

One embodiment of the invention utilizes an algorithm that allows for precise synchronous motor control without the use of expensive additional hardware. The algorithm can be applied to the control of both linear and rotating motors. This algorithm only has to be fed with relative position measurements from incremental displacement sensors, which are less expensive than Hall Effect sensors or resolvers. When a synchronous motor is equipped with incremental displacement sensors, a simple algorithm with little calculation can be implemented in the controller. This solution makes the precise control of synchronous motors as simple as the precise control of DC motors, without the performance and cleanliness drawbacks related to mechanical contacts.

One embodiment of the estimation method comprises an algorithm to get the absolute position (within a pair of motor poles) for synchronous motors using only incremental displacement sensors. The algorithm determines the initial position (when the controller is turned on) from the measure of the displacement around this position. The algorithm can generate small oscillations around the initial position. The followed trajectories may be piecewise polynomial functions that can be tuned to perform oscillations some factor (e.g., ×100) larger than the displacement sensor's resolution.

This approach is an open loop method. Unlike prior art solutions with position shift linked to the magnetic pitch (usually a couple of millimeters), the magnitude of the oscillations can be extremely small. For instance, with high precision interpolated optical incremental displacement sensors, the oscillations may be about a couple of micrometers. The algorithm provides precise initial phase determination despite unknown dry friction, motor open loop gain, and motor load.

C. Implementation of Initial Phase Estimation Techniques

Figure 2A:
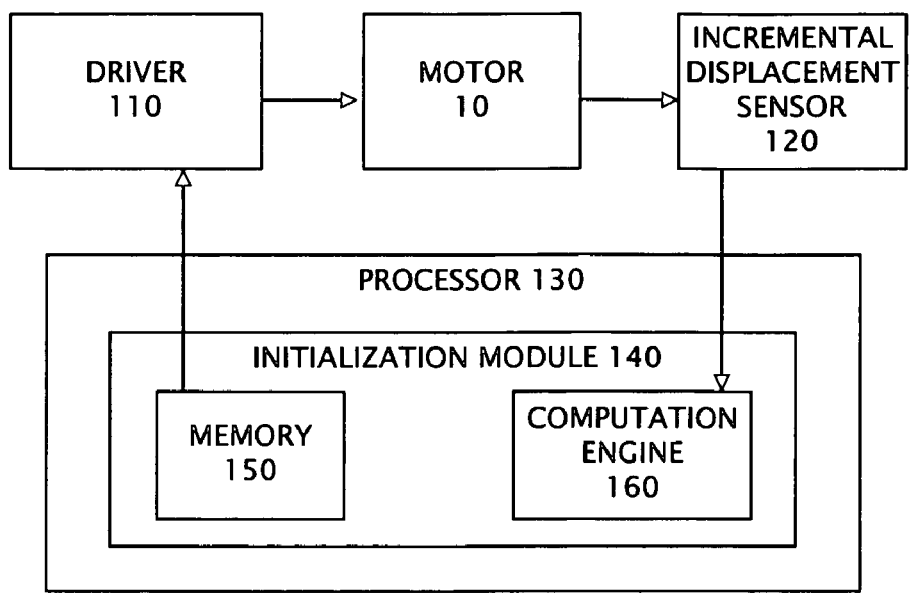
FIGS. 2A and 2B are block diagrams of initial motor phase estimation systems according to two embodiments.

FIG. 2A is a block diagram of a system 100 according to one embodiment. The system 100 comprises the motor 10, having electrical terminals, which when energized with an electrical signal result in the rotor 12 moving relative to the stator 22. The electrical terminals may be connected to the rotor 12 (as shown in FIG. 1) or to the stator, directly or indirectly. The system 100 also comprises a driver 110, which produces an electric drive signal, which is input to the electrical terminals of the motor 10. The electric drive signal may be thought of as, for example, a current signal or an equivalent voltage signal. The system 100 also comprises an incremental displacement or position sensor 120 (also called an "encoder"), which is preferably inexpensive. The incremental sensor 120 measures relative position of the rotor 12 with respect to the stator 22, relative to the initial position. In other words, the incremental sensor 120 does not provide absolute position or phase information. As a result of this shortcoming, it is not possible to most efficiently and effectively control the motor 10, until steps are taken to estimate the initial phase. One version of the incremental sensor 120 is an optical encoder comprising two parts: (1) an optical rule with regularly spaced printed lines (e.g., every 10 microns (1 "micron" or micrometer=$10^{-6}$ meters or one-millionth of a meter)) mounted on a frame, and (2) a moving optical sensor able to detect transition from line to line as the motor causes this optical sensor to move. By counting how many lines sensed, the sensor measures how far it has moved from its initial position, but it cannot determine where it is with respect to the frame. To obtain finer position resolution than the line spacing, interpolation techniques can be employed.

The system 100 also includes a processor 130, which may be any form of processor and is preferably a digital processor, such as a general-purpose microprocessor or a digital signal processor (DSP), for example. The processor 130 may be readily programmable; hard-wired, such as an application specific integrated circuit (ASIC); or programmable under special circumstances, such as a programmable logic array (PLA) or field programmable gate array (FPGA), for example. Program memory for the processor 130 may be integrated within the processor 130, or may be an external memory, or both. The processor 130 executes one or more programs or modules to perform various functions. One such module is an initialization module 140. The processor 130 may contain or execute other programs or modules (not shown), such as to control the driver 110 after initialization, to control operation of the other components of a larger system, to transfer data between other components, to associate data from the various components together (preferably in a suitable data structure), to perform calculations using the data, to otherwise manipulate the data, and to present results to a user or another processor.

One illustrative version of the initialization module 140 is illustrated in FIG. 2A. This version comprises or accesses a memory 150. Although the memory 150 is shown as being internal to the processor 130, it may be external. The memory 150 contains driver signal data. The form of the data may be formulaic, tabulated, or otherwise. Such data specifies a predetermined drive signal to excite the motor 10 via the driver 110. The drive signal is chosen to facilitate initial phase estimation as detailed below. When the motor 10 moves in response to that drive signal, the resulting relative motor position data is collected by the incremental sensor 120 and processed by a computation engine 160 within the initialization module 140. The computation engine can perform mathematical calculations to solve equations in order to estimate the motor's initial phase. Illustrative versions of those calculations and equations are explained below.

Not shown in FIG. 2A is the interface circuitry among the various components. For example, between the processor 130 and the driver 110 may be digital-to-analog (D/A) conversion circuitry, buffers, amplifiers, and the like. Moreover, between the incremental sensor 120 and processor 130 may be analog-to-digital (A/D) conversion circuitry, buffering and signal conditioning circuitry, as well as interface memory. In one version of the system 100, the data from the sensor 120 is sampled at 10 kHz (10,000 samples per second). Other sampling rates are possible.

Figure 2B:
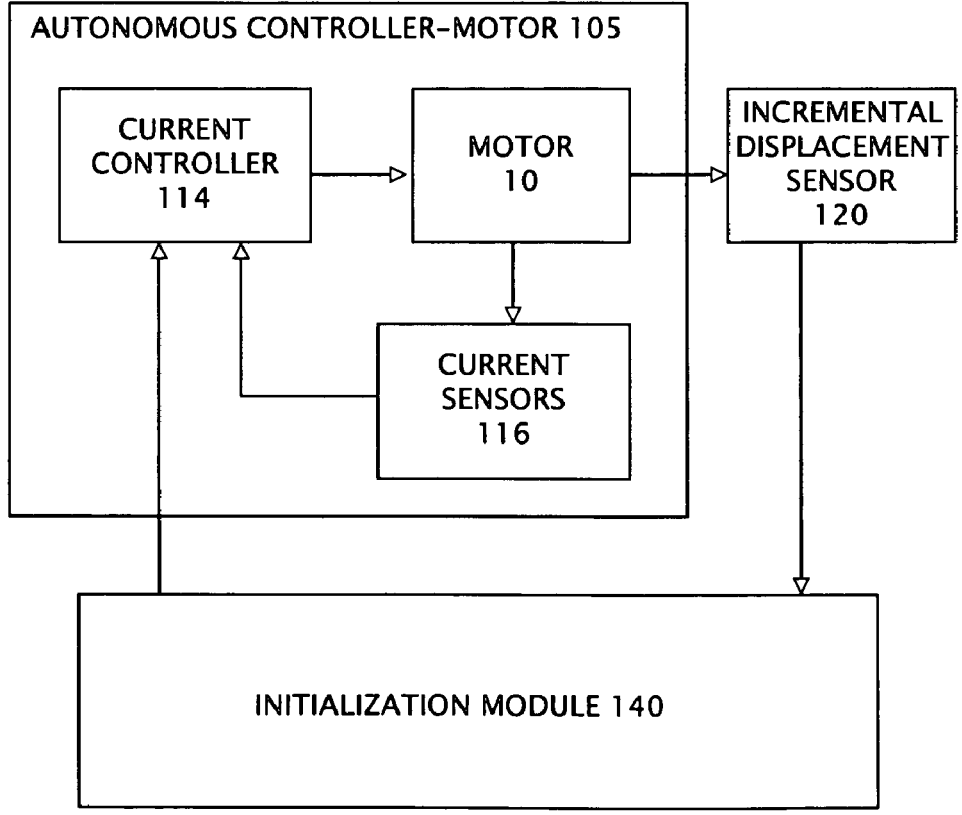

FIG. 2B is a block diagram of a system 200 according to another embodiment in which the driver 110 is a feedback-controlled current controller 114. The system 200 comprises an autonomous controller-motor 105, in which the current controller 114 produces a current signal to drive the motor 10. One or more current sensors 116 measure motor currents and provide closed-loop feedback to the current controller 114. Such a controller-motor 105 is one prevalent way to effectuate electrical commutation for a brushless motor. The controller-motor 105 is autonomous in the sense that the current measurements are not externally available for initialization or other purposes. The system 200 may be otherwise the same as the system 100.

Figure 3:
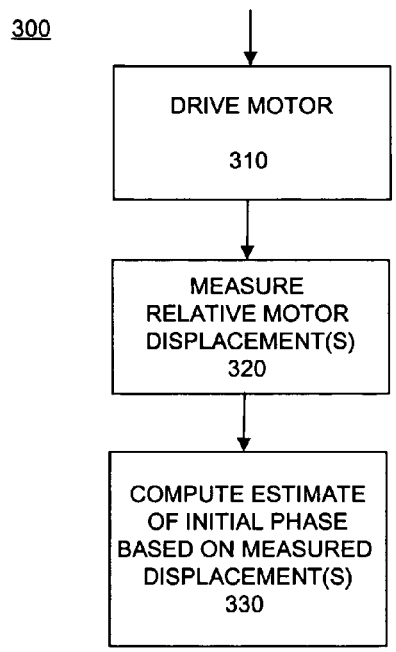
FIG. 3 is flowchart of an initial motor phase estimation method according to one embodiment.

FIG. 3 is flowchart of an initial motor phase estimation method 300, according to one embodiment. The method 300 may be performed by the processor 130 or more precisely the initialization module 140. The method 300 drives (step 310) the motor 10 using a drive signal that is a predetermined function of time. Various forms of the drive signal are presented below. For example, the drive signal may be a series of alternating finite-duration signals, each over a span T units of time long. The method 300 next measures (step 320) the resulting relative displacement(s) or position(s) of the motor in response to the drive signal. Then the method 300 computes an estimate of the initial phase based on the displacement measurement(s), assuming a mathematical relationship linking the initial phase and the displacements. That mathematical relationship is based on a model of the motor's dynamic behavior.

One relatively simple mathematical relationship can be deduced in the special case where a=1, f=0, $\hat{\phi}_0$=0. In this case, double integration of equation (12) yields $$x = \cos(\phi_0 - \phi) x_{ref}. \tag{13}$$

If $x_{ref}$ changes in magnitude from $\xi_0$ to $\xi_1$, then the measured displacement of x will be $\cos(\phi_0-\phi) \cdot (\xi_1-\xi_0)$. By measuring this displacement first when $\phi=0$ and then $\phi=\pi/2$, one gets $\cos \phi_0 \cdot (\xi_1-\xi_0)$ and $\sin \phi_0 \cdot (\xi_1-\xi_0)$, respectively. It is simple then to estimate $\phi_0$ as the arctangent of the ratio of those to displacement measurements. Note that the magnitude of the displacement can be chosen as desired, for example to be a small value, so that the motor 10 undergoes little or no noticeable movement.

A reference trajectory $x_{ref}$ that changes in magnitude from $\xi_0$ to $\xi_1$ can be designed in a number of ways. For example, first denote the reference trajectory as an elementary trajectory $x_{elem}(t)$, and let it go from rest at an initial point $\xi_0$ to rest at a final point $\xi_1$. That translates into the following initial and final conditions:

$$x_{elem}(0)=\xi_0, \dot{x}_{elem}(0)=0, \ddot{x}_{elem}(0)=0 \quad (14)$$

$$x_{elem}(T)=\xi_1, \dot{x}_{elem}(T)=0, \ddot{x}_{elem}(T)=0 \quad (15)$$

where T is the time it takes for a one-way run from $\xi_0$ to $\xi_1$. The value of T can be set so that actuator saturations or other physical constraints are satisfied. From here, any function satisfying the initial and final conditions is acceptable.

One particular form of a satisfactory function is a polynomial. A fifth-order polynomial can satisfy these conditions. Such a polynomial may have the following form:

$$x_{elem}(t) = \xi_0 + (\xi_1 - \xi_0)\sum_{i=1}^{5} a_i \left(\frac{t}{T}\right)^i \quad (16)$$

The coefficients $\{a_i\}_{1 \leq i \leq 5}$ can be found by solving a linear system of equations. A solution is $$a_1=a_2=0, a_3=10, a_4=-15, a_5=6. \quad (17)$$

The corresponding command $I_{ref}(t)$ to make the motor move from $\xi_0$ to $\xi_1$ between 0 and T is $$I_{ref}(t) = \frac{m}{K_m} \times \underbrace{\frac{x_1 - x_0}{T^2}\left(60\left(\frac{t}{T}\right) - 180\left(\frac{t}{T}\right)^2 + 120\left(\frac{t}{T}\right)^3\right)}_{\ddot{x}_{ref}(t)} \quad (18)$$

To make the motor move backwards during the interval $T \leq t \leq 2T$, $-I_{ref}(t-T)$ can be sent as a drive signal and the trajectory (for position) is $-x_{elem}(t)$. Let $x_M$ denote the trajectory made up of elementary trajectories $\pm x_{elem}$ so that the motor makes M round trips from $\xi_0$ to $\xi_1$ and back to $\xi_0$. Thus the corresponding command is $$I_{ref}^M(t) = \frac{m}{K_m}\ddot{x}_M(t). \quad (19)$$

An alternative technique for designing a drive signal is as follows: First, consider an elementary function of time defined on an interval of length 2T and whose value is zero at $t=0$ and at $t=2T$ (i.e., $x_{elem}(0)=x_{elem}(T)=0$). Repeat this pattern an arbitrary number of times at arbitrarily chosen positions on the time axis and differentiate the resulting function twice to derive the electrical drive signal. In a special case, the elementary function has zero first derivative at $t=0$ and at $t=2T$ (i.e., $\dot{x}_{elem}(0)=\dot{x}_{elem}(T)=0$) In a further special case, the elementary function is symmetric about $t=T$. In a further special case, the electric drive signal is periodic with period 2T. Note that this approach works for any magnitude of the signal.

Because of the unknown parameters in equations (10) and (12), when $\ddot{x}_{ref}=\ddot{x}_M$, the system does not follow the trajectory $x_M$ unless the following conditions are fulfilled: $\alpha=1$, $f=0$, $\hat{\varphi}_0=\varphi_0$ (i.e., when all parameters are known). Still, as long as $f=0$, only the magnitude of the displacements is affected by the unknown parameters and the measured trajectory is proportional to $x_M$. On the other hand, when $f \neq 0$, the friction introduces a delay. Thus, when $\ddot{x}_{ref}=\ddot{x}_M$, it is possible to distinguish between the different unknown parameters as they delay or rescale the reference trajectory $x_M$.

It is nonetheless possible to extract the initial phase from the measured displacements despite unknown parameters. To do so, integrate equation (12) twice, with $\ddot{x}_{ref}=\ddot{x}_M$, to make explicit the relation between the measured displacements around the initial position and the different parameters of the model featuring a discontinuous right-hand side. The right-hand side is discontinuous because of the friction term. Two of the present inventors (Jérémy Malaizé and Jean Lévine) have analyzed this mathematical problem and published their analysis and solution in an article entitled "Active Estimation of the Initial Phase for Brushless Synchronous Motors" appearing in *Proceedings of the 9th International Workshop on Advanced Motion Control*, Mar. 27-29, 2006, Istanbul, Turkey, (IEEE Catalog No. 06TH8850C) (ISBN: 0-7803-9513-3). That article is incorporated herein in its entirety.

The solution to the problem in this case is as follows. First, let $\{\varphi_i\}_{1 \leq i \leq N}$ be a set of N real numbers and define $$\delta_i = \alpha \varepsilon_i \cos(\varphi_0 - \varphi_i)(\xi_1 - \xi_0)\Delta(\mu_i) \quad (20)$$

where $$\mu_0 = \alpha \ddot{x}_{max} \frac{m}{f} \quad (21)$$

$$\varepsilon_i = \text{sign}(\cos(\varphi_0 - \varphi_i)) \quad (22)$$

$$\mu_i = \varepsilon_i \mu_0 \cos(\varphi_0 - \varphi_i) \quad (23)$$

and $\ddot{x}_{max}$ is the maximum value of the reference acceleration:

$$\ddot{x}_{max} = \max_{0 \leq t \leq T} |\ddot{x}_{elem}(t)|, \quad (24)$$

and $\Delta$ is a function satisfying the relation $$\lim_{k \to \infty}\left[\max_{0 \leq \tau \leq T} |x(kT + \tau) - x(kT)|\right] = \alpha|\cos(\varphi_0 - \hat{\varphi}_0 - \varphi)|(\xi_1 - \xi_0)\Delta(\mu). \quad (25)$$

Figure 4A:
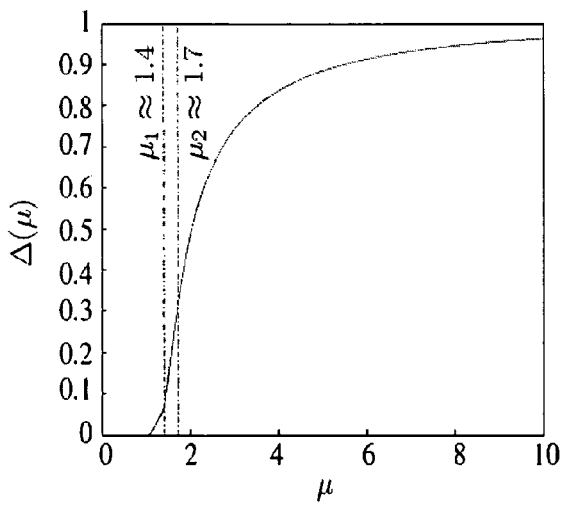
FIGS. 4A and 4B are plots of functions utilized in certain embodiments.
Figure 4B:
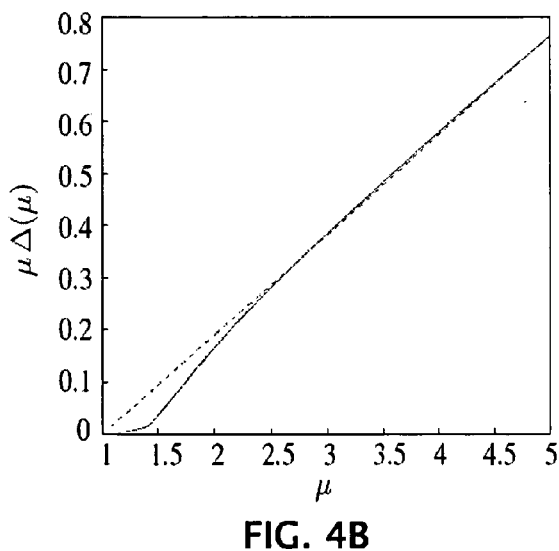

The function $\Delta$ describes how friction alters the behavior of the motor 10 and depends on the drive signal sent to the motor 10. One example of a suitable function $\Delta(\mu)$ is illustrated in FIG. 4A, and the function $\mu\Delta(\mu)$ is illustrated in FIG. 4B.

To continue toward the solution, let $(i,j) \in \{1,\ldots,N\}^2$ and $i \neq j$. Then, according to the previous notations, the following expression can be derived:

$$\frac{\delta_i}{\delta_j} = \frac{\mu_i \Delta(\mu_i)}{\mu_j \Delta(\mu_j)}. \quad (26)$$

Denote $J_{ij}(\phi_0, \mu_0)$ as the following function:

$$J_{ij}(\phi_0, \mu_0)=(\delta_i\mu_j\Delta(\mu_j)-\delta_j\mu_i\Delta(\mu_i))^2 \qquad (27)$$

Estimating the initial phase then comes down to solving the following optimization problem:

$$(\hat{\varphi}_0, \hat{\mu}_0) = \arg\min_{\substack{\varphi_0 \in \mathbb{R} \\ \mu_0 \in \mathbb{R}^+}} \left( \sum_{i,j;j>i} J_{ij}(\varphi_0, \mu_0) \right). \qquad (28)$$

Equation (28) may be solved by any technique, including, for example, iterative or other numerical techniques. One technique for solving equation (28) involves approximating the function $\mu\Delta(\mu)$. One particular approximation is the following:

$$\mu\Delta(\mu) \approx \gamma(\mu-1) \forall \mu \geq 1 \qquad (29)$$

for some constant $\gamma \in \mathbb{R}^+$. An approximation of this form is illustrated in FIG. 4B by the dashed line. Substituting the approximation from equation (29) into equation (27), after some manipulations (which are detailed in the above-referenced IEEE workshop paper), yields the following approximate form of the function $$J = \sum_{i,j;j>i} J_{ij}(\varphi_0, \mu_0):$$

$$\tilde{J}(\theta)=\theta^T M^T A M \theta + b^T M \theta + c \qquad (30)$$

where $\theta$ is a two-dimensional vector as follows:

$$\theta = \mu_0 \begin{bmatrix} \cos\varphi_0 \\ \sin\varphi_0 \end{bmatrix}, \qquad (31)$$

M is an N×2 matrix as follows:

$$M = \begin{bmatrix} \varepsilon_1 \cos\varphi_1 & \varepsilon_1 \sin\varphi_1 \\ \vdots & \vdots \\ \varepsilon_N \cos\varphi_N & \varepsilon_N \sin\varphi_N \end{bmatrix}, \qquad (32)$$

A is an N×N matrix whose elements are as follows:

$$A(i, i) = \sum_{j \neq i} \delta_j^2, \qquad (33)$$

$$A(i, j) = A(j, i) = -\delta_i \delta_j \forall i \neq j, \qquad (34)$$

b is a N-dimension vector whose elements are as follows:

$$b(i) = 2\sum_{j \neq i} \delta_j(\delta_i - \delta_j), \qquad (35)$$

and c is the following scalar:

$$c = \sum_{i,j}(\delta_i - \delta_j)^2. \qquad (36)$$

Given the approximations from equations (30)-(36), the optimization problem has the following quadratic form:

$$\hat{\theta} = \underset{\theta \in R^2}{\operatorname{argmin}} \tilde{J}(\theta) \qquad (37)$$

subject to $\varepsilon_i[\cos\phi_i \ \sin\phi_i]\cdot\theta \geq 1 \ \forall i$. Those skilled in the art can readily solve this type of optimization problem. The solution is the vector $\hat{\theta}$, the phase of which is $\hat{\phi}_0$, the estimate of the initial phase of the motor.

D. Design of Initial Phase Estimation Techniques

Figure 5:
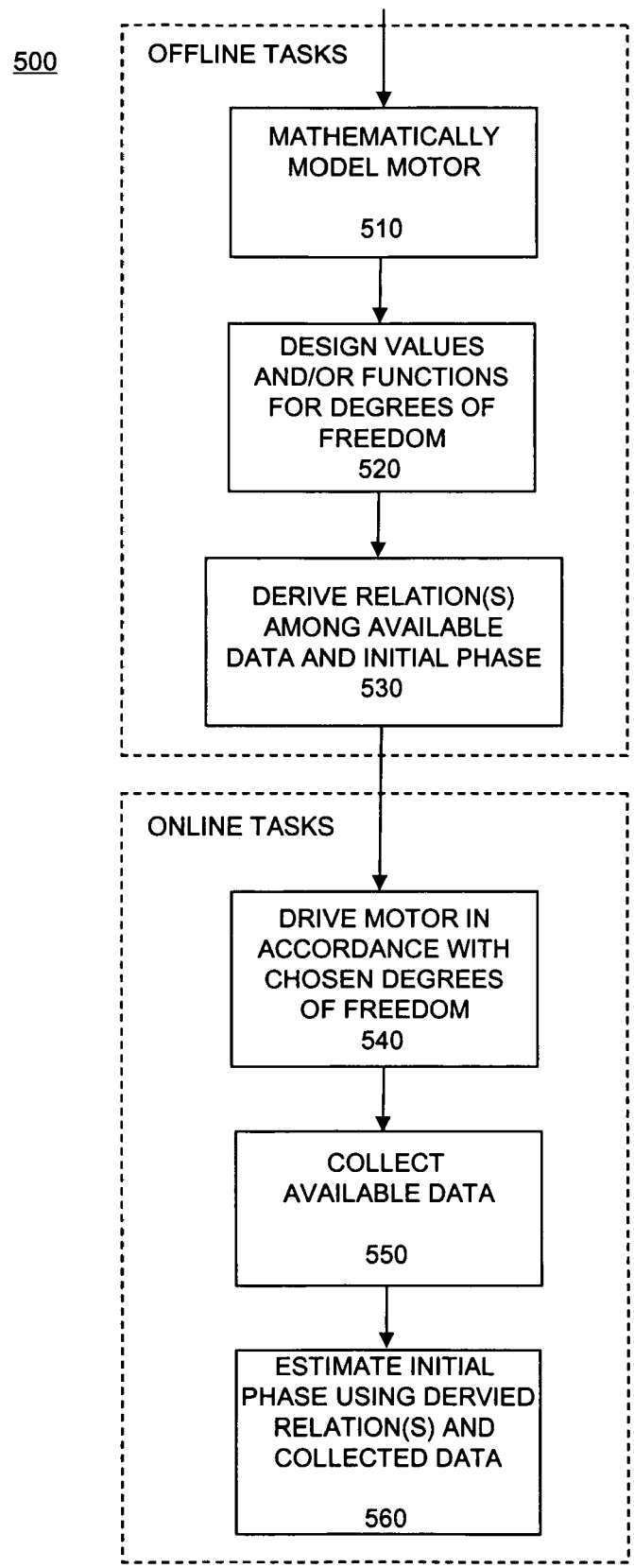
FIG. 5 is a flowchart of a design-implementation process suitable for developing initial motor phase estimation methods and systems, according to one embodiment.

The foregoing subsection C presented several particular techniques for determining the initial phase of a brushless or synchronous motor using only incremental position measurements. Other suitable techniques can be developed, for example, using a general framework illustrated in flowchart form in FIG. 5. FIG. 5 is a flowchart of a design-implementation process 500 suitable for developing initial motor phase estimation methods. The design-implementation process 500 entails offline tasks performed before operation of the machine or apparatus in which the operational phase estimation method is performed, as well as the online tasks performed to do the estimation.

The offline tasks include mathematically modeling the motor 10 (step 510). This step 510 may involve equations (4)-(6) or similar relations. One illustrative mathematical model is given by equations (10) or (12), when equations (4)-(6) are combined with classical field-oriented current control, as in equations (7)-(9). Other mathematical models are possible. Simplifying assumptions may or may not be made in step 510.

Another offline task is designing values and/or functions for the degrees of freedom in the mathematical model (step 520). Such degrees of freedom may naturally appear in the model or may be introduced in some cases. In the techniques described above, the degrees of freedom are the drive current I(t) and the phase term $\phi$. Other degrees of freedom may arise in other formulations of the problem. One example of a drive current is given in equation (18) or (19). From one perspective, the technique described above involves making a series of guesses of the initial position $\phi_0$, and putting the drive current I(t) in phase with these guesses (which are most likely wrong). This can be done by repeating application of the drive current I(t) N times, once at each of phase $\phi_i$, $1 \leq i \leq N$. After each application, a displacement magnitude d is measured, leading to an estimate via solving an equation such as equation (28) or an approximation thereto, such as equation (37).

Another offline step, as already alluded to, is deriving relation(s) among available data and the initial phase to be estimated (step 530). As already, explained above, available data may be readily measurable relative position or displacement data, which can be collected with sufficient accuracy using inexpensive incremental sensors. Much of the preceding material in this document has presented some such relations for such data. Others relations are possible, and other types of data may be available with other suitable sensors. The relations are preferably easy to invert, but that need not be the case. There is a tradeoff between accuracy and latency in computation. Some situations may call for enhanced accuracy at the expense of increased latency in the computation of the initial phase estimate (step 560, discussed below). Furthermore, the computational speed and power of processors continues to advance, and computations that are too demanding at the time of this writing may not be so in the future.

Once the steps 510-530 have been performed offline, the technique can be put to practice, online if desired. Accordingly, the next task in the design process 500 is to drive the motor in accordance with the choices made for the degrees of freedom in the system (step 540). One example of the step 540 is the step 310 in the method 300 (FIG. 3). Next, the method 500 collects (step 550) available data, which may be only relative position or displacement data from an incremental position sensor. Finally, the method 500 forms an estimate of the initial phase using the derived relation(s) and the collected data.

Figure 6:
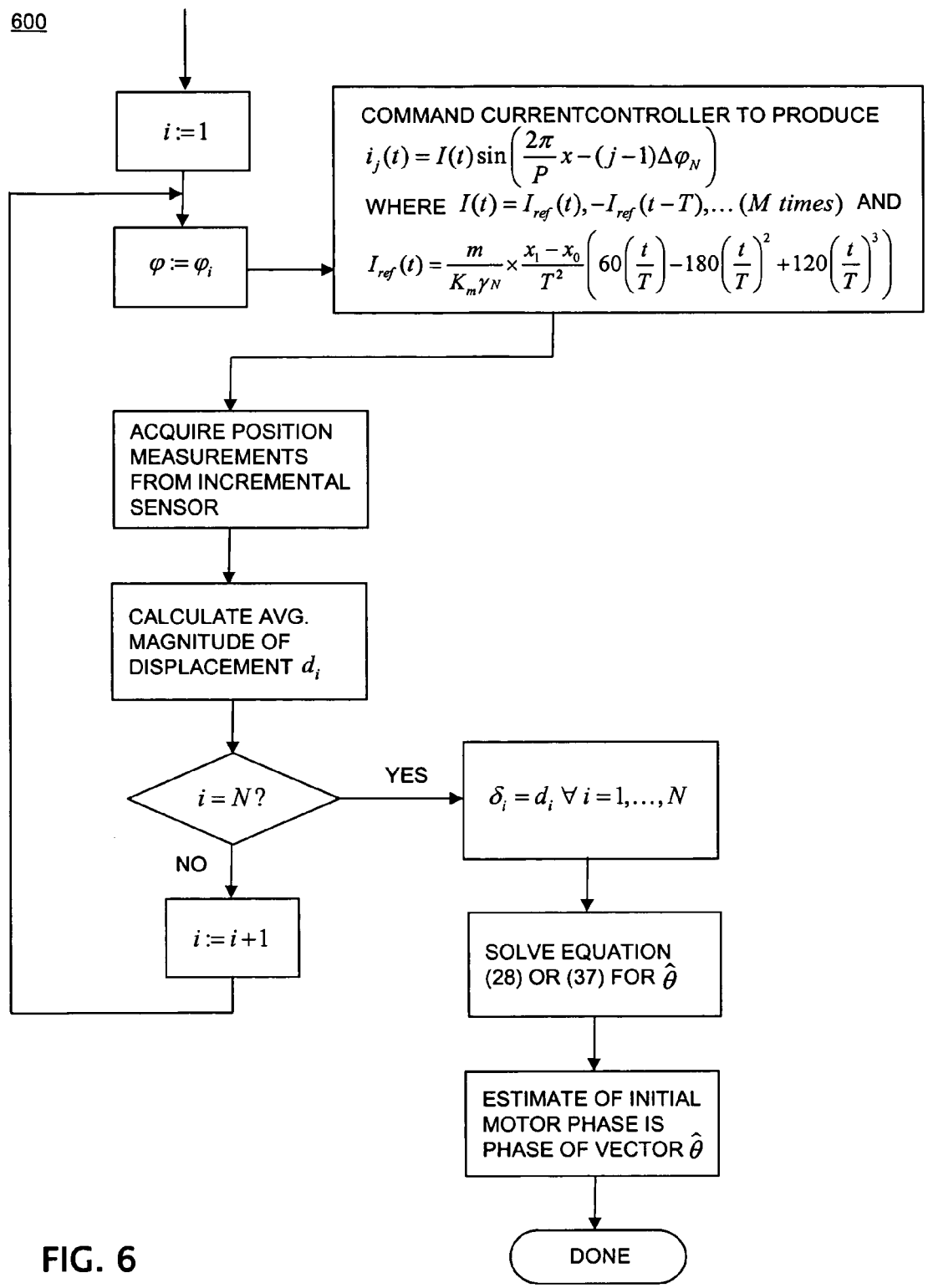
FIG. 6 is a detailed flowchart of a an initial motor phase estimation method according to one embodiment.

FIG. 6 is a detailed flowchart of one version of the online tasks 540-560 of the method 500 or of the method 300 (FIG. 3). The method 600 in FIG. 6 implements the specific equations presented above. The parameter M, which represents how many times the back-and-forth oscillations are induced in the motor, may be a number. One suitable choice is M=5. It is possible to set M=1, but accuracy can be enhanced with a larger value of M. The parameter N represents how many arbitrary phase guesses are utilized. One suitable choice is N=4, and $$\{\varphi_i\}_{1 \le i \le 4} = \{0, \frac{\pi}{2}, \pm \frac{\pi}{4}\}.$$

For each average phase $\varphi_i$, utilize the average displacement magnitude $d_i$ in place of $\delta_i$ in the foregoing equations.

E. Experimental Results

Figure 7A:
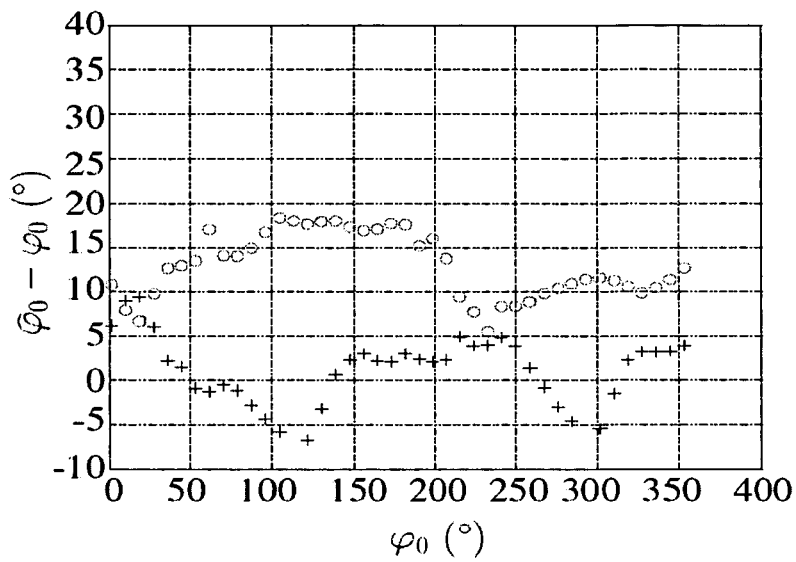
FIGS. 7A, 7B, and 7C are plots of experimental results from one embodiment.
Figure 7B:
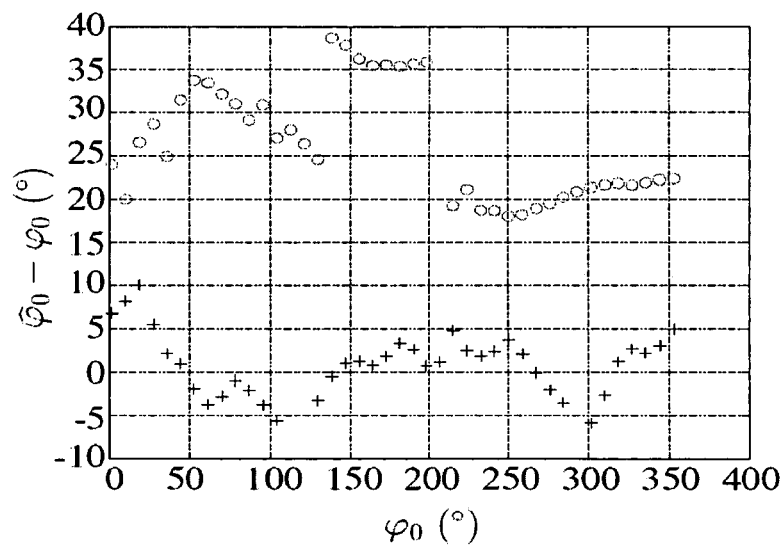
Figure 7C:
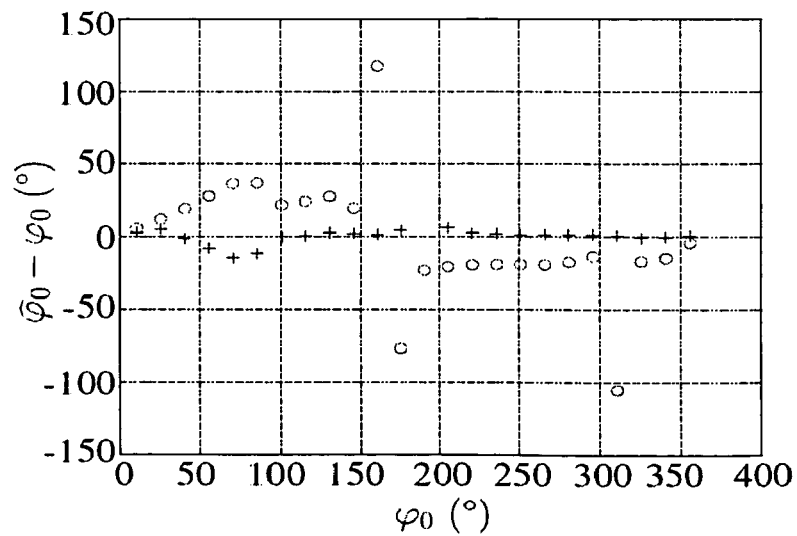

FIGS. 7A-7C are plots of experimental results for one embodiment based on the method 600 of FIG. 6. Each of FIGS. 7A-7C plots data for two cases: (1) based on the method 600—shown with "+" symbols—and (2) using a prior art technique like the one described in paragraph [7] of this document—shown with circles. In each case, what is plotted is the estimation error ($\hat{\varphi}_0 - \varphi_0$) for various values of $\varphi_0$. To perform these experiments, the true value of the motor's initial phase was measured using a measurement of back electromotive force. With that information, the motor could be set at each of several values of initial phase $\varphi_0$ between 0 and 360°. At each initial phase position, ten trials were conducted for each technique to compute an average estimation error for each technique. For FIGS. 7A and 7B, the motor is a linear motor having a known friction parameter. For FIG. 7A, the maximum acceleration is $\ddot{x}_{max}$=1000 mm/s² (millimeters per second per second). The results for the embodiment based on the method 600 appear to have an unbiased distribution centered about zero error, with the error usually less than about 5°. Ten degrees of precision (+/−5°) means that the motor will operate with an efficiency not worse than about 98%. This small estimation error for the embodiment based on the method 600 may be due to motor imperfections not captured by the particular motor dynamic model underlying the method 600. Such imperfections might be ripple in the term $B_0$ or the friction f. The prior art technique, however, exhibits bias that is on average about +10° in FIG. 7A, and about +30% in FIG. 7B, for which the maximum acceleration $\ddot{x}_{max}$=500 mm/s².

FIG. 7C represents the results for a second motor with a larger friction parameter, which necessitates a larger reference acceleration $\ddot{x}_{max}$=4000 mm/s². The prior art method exhibits large variations in estimation error and does not perform well, whereas the embodiment based on the method 600 continues to achieve approximately the same precision (about 10°) without noticeable bias.

F. Conclusion

The algorithms for operating the methods and systems illustrated and described herein can exist in a variety of forms both active and inactive. For example, they can exist as one or more software or firmware programs comprised of program instructions in source code, object code, executable code or other formats. Any of the above can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Similarly, the embodiments described herein are set forth by way of illustration only and are not the only means of practicing the invention. Those skilled in the art will recognize that many variations can be made to the details of the above-described embodiments without departing from the underlying principles of the invention. For example, although certain steps of the methods are explained or depicted in a particular order here, some steps can be performed in a different order relative to other steps in the same method, simultaneously with other steps, divided into finer sub-steps, or consolidated with other steps. The scope of the invention should therefore be determined only by the following claims (and their equivalents) in which all terms are to be understood in their broadest reasonable sense unless otherwise indicated.

The invention claimed is:

1. An apparatus comprising:
    a brushless motor having a rotor, a stator, and electrical terminals accepting an electric drive signal, the motor characterized by an a priori unknown initial phase of the rotor with respect to the stator;
    a driver connected to the electrical terminals and producing the electric drive signal;
    an incremental displacement sensor configured to measure a displacement of the rotor with respect to the stator and producing an output signal indicative of the displacement;

a processor having an input receiving the output signal from the displacement sensor and having an output connected to the driver, the processor configured:
to cause the driver to produce the electric drive signal according to a predetermined function of time,
to observe the output signal from the displacement sensor resulting from the electric drive signal, and
to perform mathematical computations on the basis of the observed output signal and a model of dynamic behavior of the motor to estimate the initial phase of the rotor with respect to the stator.

2. An apparatus according to claim 1, wherein the motor is a linear motor.

3. An apparatus according to claim 1, wherein the motor is a rotary motor.

4. An apparatus according to claim 1, wherein the driver is a current controller.

5. An apparatus according to claim 1, wherein the electric drive signal is such that the magnitude of a position displacement resulting from the electric drive signal is small.

6. An apparatus according to claim 1, wherein the electric drive signal is a second derivative of a function that is a pattern of M time-shifted versions of a base function defined over an interval from time=0 and to time=2T, wherein the value of the base function is zero at time=0 and at time=2T.

7. An apparatus according to claim 6, wherein the base function has zero first derivatives at time=0 and at time=2T.

8. An apparatus according to claim 7, wherein the base function is symmetric about time=7.

9. An apparatus according to claim 7, wherein the base function is a polynomial.

10. An apparatus according to claim 9, wherein the electric drive signal is at least approximately related to time as by a function of the form:

$$\frac{1}{T^2}\left[60\left(\frac{t}{T}\right) - 180\left(\frac{t}{T}\right)^2 + 120\left(\frac{t}{T}\right)^3\right].$$

11. An apparatus according to claim 1, wherein the electric drive signal is time-varying with more than two nominal positions.

12. An apparatus according to claim 1, wherein the electric drive signal is an oscillating signal.

13. An apparatus according to claim 1, wherein the processor is a general-purpose microprocessor.

14. An apparatus according to claim 13, further comprising:
memory in which are stored program instructions for execution on the processor, the program instructions causing the processor to perform the tasks for which the processor is configured.

15. An apparatus according to claim 13, wherein the processor is further configured to store the output signal from the position sensor.

16. An apparatus according to claim 1, wherein the model of the dynamic behavior of the motor is of the form $$m\ddot{x} = K_m \cos(\phi_0 - \phi)I - f\, \mathrm{sgn}(\dot{x})$$

where m is a load on the motor, $K_m$ is a motor gain, $\phi_0$ is the initial phase, $\phi$ is a degree of freedom, I is a rotor current reference, f is a friction force, and x is a position of the rotor with respect to the stator.

17. An apparatus according to claim 16, wherein m, $K_m$, $\phi_0$, and f are unknown variables.

18. An apparatus according to claim 1, wherein the mathematical computations comprise solving an optimization problem.

19. An apparatus according to claim 18, wherein solving the optimization problem comprises utilizing a linear approximation to simplify the optimization problem.

20. An apparatus according to claim 1, wherein the processor is configured:
to cause the driver to produce a series of electric drive signals according to a predetermined function of time,
to observe the output signals from the position sensor resulting from the series of electric drive signals, and
to perform mathematical computations on the basis of the observed output signals and a model of dynamic behavior of the motor to estimate the initial phase of the rotor with respect to the stator.

21. An apparatus according to claim 20, wherein the electric drive signals are field-oriented control signals, each having an selectable phase, and wherein the processor selects different selectable phases for each electric drive signal.

22. An apparatus according to claim 1, wherein the initial phase of the rotor with respect to the stator is estimated using a nonzero displacement measured by the displacement sensor.

23. An apparatus according to claim 1, wherein a difference between the estimated initial phase of the rotor with respect to the stator and a measurement of the initial phase of the rotor with respect to the stator using a back electromotive force does not exceed approximately 5 degrees.

24. An apparatus according to claim 1, wherein the initial phase of the rotor with respect to the stator is estimated using derived relations among a plurality of observed output signals and a plurality of initial phases of the rotor with respect to the stator, the derived relations derived in advance of the observed output signal.

25. A method for estimating an a priori unknown initial phase of a rotor with respect to a stator, wherein the rotor and the stator are parts of a synchronous motor that is not equipped with a capability to directly measure the absolute phase of the rotor with respect to the stator, the method comprising:
applying to the motor an electric drive signal according to a predetermined oscillating function of time, so as to cause a sequence of displacements of the rotor with respect to the stator;
collecting data from the motor in response to the electric drive signal;
performing mathematical computations on the basis of the collected data and a model of dynamic behavior of the motor; and
estimating the initial phase of the rotor with respect to the stator based on the mathematical computations.

26. A method according to claim 25, wherein the motor is a linear motor.

27. A method according to claim 25, wherein the drive signal is a current signal.

28. A method according to claim 25, wherein the electric drive signal is time-varying with more than two nominal values.

29. A method according to claim 25, wherein the collected data comprises measurement of relative displacement of the rotor with respect to the stator.

30. A method according to claim 25, wherein the electric drive signal is a piecewise polynomial function of time.

31. A method according to claim 30, wherein the polynomial has the form:

$$\frac{1}{T^2}\left[60\left(\frac{t}{T}\right) - 180\left(\frac{t}{T}\right)^2 + 120\left(\frac{t}{T}\right)^3\right].$$

where T is a half period of oscillation.

32. A method according to claim 25, wherein the model of the dynamic behavior of the motor is of the form $$m\ddot{x} = K_m \cos(\phi_0 - \phi)I - f\,\text{sgn}(\dot{x})$$

where m is a load on the motor, $K_m$ is a motor gain, $\phi_0$ is the initial phase, $\phi$ is a degree of freedom, I is a rotor current reference, f is a friction force, and x is a position of the rotor with respect to the stator.

33. A method according to claim 25, wherein performing mathematical computations comprises solving an optimization problem.

34. A method according to claim 33, wherein solving the optimization problem comprises utilizing a linear approximation to simplify the optimization problem.

35. A method according to claim 25, further comprising: repeating the steps of applying to the motor an electric drive signal, and of collecting data from the motor in response to the electric drive signal.

36. A method according to claim 35, wherein the electric drive signals are field-oriented control signals, each having a selectable phase, and wherein a different selectable phase is utilized each time the step of applying to the motor an electric drive signal is repeated.

37. A method according to claim 25, further comprising: controlling the synchronous motor based on the estimated initial phase.

38. A method according to claim 25, wherein the initial phase of the rotor with respect to the stator is estimated using a nonzero displacement of the rotor with respect to the stator.

39. A method according to claim 25, wherein a difference between the estimated initial phase of the rotor with respect to the stator and a measurement of the initial phase of the rotor with respect to the stator using a back electromotive force does not exceed approximately 5 degrees.

40. A method according to claim 25, wherein the initial phase of the rotor with respect to the stator is estimated using derived relations among a plurality of displacements of the rotor with respect to the stator in response to a plurality of applied electric drive signals and a plurality of initial phases of the rotor with respect to the stator, the derived relations derived in advance of applying the electric drive signal.

41. A method for estimating an a priori unknown initial phase of a rotor with respect to a stator, wherein the rotor and the stator are parts of a synchronous motor that is not equipped with a capability to directly measure the absolute phase of the rotor with respect to the stator, wherein the dynamic behavior of the motor is modeled by a mathematical model that relates data observable from the motor to the initial phase, the mathematical model characterized by one or more degrees of freedom, the method comprising:

applying to the motor a plurality of electric drive signals, wherein each electric drive signal is a function of one or more of said one or more degrees of freedom, and each electric drive signal is characterized by a different set of values chosen for said one or more degrees of freedom;

collecting data from the motor in response to the electric drive signals;

performing mathematical computations on the basis of the collected data and a model of dynamic behavior of the motor; and estimating the initial phase of the rotor with respect to the stator based on the mathematical computations.

42. A method according to claim 41, wherein the electric drive signals are current signals.

43. A method according to claim 42, wherein the current signals are field-oriented current control signals, and one of said one or more degrees of freedom is a selectable phase of the field-oriented current control signals.

44. A method according to claim 41, wherein one of said one or more degrees of freedom is time variation of the electric drive signals.

45. A method according to claim 44, wherein the time variation of the electric drive signals is a finite number of oscillations, each half period of which is based on the following polynomial function of time:

$$\frac{1}{T^2}\left[60\left(\frac{t}{T}\right) - 180\left(\frac{t}{T}\right)^2 + 120\left(\frac{t}{T}\right)^3\right].$$

where T is one half period.

46. A method according to claim 41, wherein the collected data comprises measurement of relative displacement of the rotor with respect to the stator.

47. A method according to claim 41, wherein the model of the dynamic behavior of the motor is of the form $$m\ddot{x} = K_m \cos(\phi_0 - \phi)I - f\,\text{sgn}(\dot{x})$$

where m is a load on the motor, $K_m$ is a motor gain, $\phi_0$ is the initial phase, $\phi$ is a degree of freedom, I is a rotor current reference, f is a friction force, and x is a position of the rotor with respect to the stator.

48. A method according to claim 41, further comprising: controlling the synchronous motor based on the estimated initial phase.

49. A method according to claim 41, wherein the data collected from the motor in response to the electric drive signals includes a nonzero displacement of the rotor with respect to the stator and the initial phase of the rotor with respect to the stator is estimated based on the nonzero displacement of the rotor with respect to the stator.

50. A method according to claim 41, wherein a difference between the estimated initial phase of the rotor with respect to the stator and a measurement of the initial phase of the rotor with respect to the stator using a back electromotive force does not exceed approximately 5 degrees.

51. A method according to claim 41, wherein:

the data collected from the motor in response to the electric drive signals includes a plurality of nonzero displacements of the rotor with respect to the stator; and the initial phase of the rotor with respect to the stator is estimated using derived relations among a plurality of displacements of the rotor with respect to the stator in response to a plurality of applied electric drive signals and a plurality of initial phases of the rotor with respect to the stator, the derived relations derived in advance of applying the plurality of electric drive signals.

52. A system for estimating the initial phase of a brushless motor having a rotor and a stator, and electrical terminals accepting an electric drive signal, the motor characterized by an a priori unknown initial phase of the rotor with respect to the stator, the system comprising:

a means, connected to the electrical terminals, for producing the electric drive signal;

a means for measuring an incremental position change of the rotor with respect to the stator and for producing an output signal indicative of the position change;

a means for causing the driver to produce the electric drive signal according to a predetermined function of time, a means for observing the output signal from the position sensor resulting from the electric drive signal, and a means for performing mathematical computations on the basis of the observed output signal and a model of dynamic behavior of the motor to estimate the initial phase of the rotor with respect to the stator.

* * * * *